US009851251B2

(12) United States Patent
Otto

(10) Patent No.: US 9,851,251 B2
(45) Date of Patent: Dec. 26, 2017

(54) SPECTROMETER

(71) Applicant: MICRO-EPSILON Optronic GmbH, Langebrueck (DE)

(72) Inventor: Tobias Otto, Langebrueck (DE)

(73) Assignee: MICRO-EPSILON Optronic GmbH, Langebrueck (DE)

( * ) Notice: Subject to any disclaimer, the term of this patent is extended or adjusted under 35 U.S.C. 154(b) by 0 days.

(21) Appl. No.: 15/122,530

(22) PCT Filed: Feb. 6, 2015

(86) PCT No.: PCT/DE2015/200066
§ 371 (c)(1),
(2) Date: Aug. 30, 2016

(87) PCT Pub. No.: WO2015/149759
PCT Pub. Date: Oct. 8, 2015

(65) Prior Publication Data
US 2017/0067780 A1 Mar. 9, 2017

(30) Foreign Application Priority Data

Mar. 31, 2014 (DE) .................. 10 2014 206 061
Jan. 5, 2015 (DE) .................. 10 2015 200 034

(51) Int. Cl.
G01J 3/28 (2006.01)
G01J 3/14 (2006.01)
G01J 3/02 (2006.01)
G01J 3/22 (2006.01)
(Continued)

(52) U.S. Cl.
CPC ............... *G01J 3/14* (2013.01); *G01J 3/0208* (2013.01); *G01J 3/0256* (2013.01); *G01J 3/18* (2013.01); *G01J 3/22* (2013.01); *G01J 3/2803* (2013.01); *G01J 2003/1208* (2013.01)

(58) Field of Classification Search
CPC ........ G01J 3/02; G01J 3/14; G01J 3/18; G01J 3/28; G01J 3/22; G01N 31/74
See application file for complete search history.

(56) References Cited

U.S. PATENT DOCUMENTS 6,661,513 B1 12/2003 Granger
6,816,258 B2 11/2004 Hutchin
7,929,134 B2 4/2011 Hu et al.
(Continued)

FOREIGN PATENT DOCUMENTS

CN 102564591 A 7/2012
CN 102662287 A 9/2012
(Continued)

OTHER PUBLICATIONS

The International Bureau of WIPO, International Preliminary Report on Patentability (English translation of ISA's Written Opinion) for International Application No. PCT/DE2015/200066, dated Oct. 4, 2016, 8 pages, Switzerland.
(Continued)

Primary Examiner — Abdullahi Nur
(74) Attorney, Agent, or Firm — Alston & Bird LLP

(57) ABSTRACT

The invention relates to a spectrometer comprising a combination of at least one grid (1) and at least one prism (2), characterized in that total reflexion is used to produce a compact spectrometer in at least one prism (2).

8 Claims, 3 Drawing Sheets

(51) Int. Cl.
*G01J 3/18* (2006.01)
*G01J 3/12* (2006.01)

(56) References Cited

U.S. PATENT DOCUMENTS

| | | | |
|---|---|---|---|
| 8,102,537 | B2 | 1/2012 | Akishiba |
| 2005/0286144 | A1* | 12/2005 | Malfait ............. G02B 17/04 359/738 |
| 2009/0051899 | A1* | 2/2009 | Harlander ............ G01J 3/453 356/51 |
| 2010/0014082 | A1 | 1/2010 | Loecklin |
| 2012/0024298 | A1 | 2/2012 | Gillis et al. |
| 2012/0188541 | A1 | 7/2012 | Demmer et al. |
| 2012/0242988 | A1 | 9/2012 | Saxer et al. |

FOREIGN PATENT DOCUMENTS

| | | |
|---|---|---|
| CN | 103389159 A | 11/2013 |
| DE | 279731 A1 | 6/1990 |
| DE | 102011080278 A1 | 2/2013 |
| WO | WO 01/95542 A2 | 12/2001 |

OTHER PUBLICATIONS

Gelikonov, V.M., et al., "Linear-Wavenumber Spectrometer for High-Speed Spectral-Domain Optical Coherence Tomography", *Optics and Spectroscopy*, 2009, pp. 459-465, vol. 106, No. 3, Pleiades Publishing, Ltd., Russia.

Hu, Zhilin, et al., "Fourier domain optical coherence tomography with a linear-in-wavenumber spectrometer", *Optics Letters*, Dec. 15, 2007, pp. 3525-3527, vol. 32, No. 24, Optical Society of America, U.S.A.

International Searching Authority, International Search Report (ISR) and Written Opinion for International Application No. PCT/DE2015/200066, Jun. 17, 2015, 13 pages, European Patent Office, Netherlands.

Traub, W. A., "Constant-dispersion grism spectrometer for channeled spectra", *A Journal of the Optical Society of America*, Sep. 1990, pp. 1779-1791, vol. 7, No. 9, Optical Society of America, U.S.A.

State Intellectual Property Office of the P.R.C., First Office Action (and search report) for Application No. 201580016218.9, dated May 10, 2017, 13 pages, China.

* cited by examiner

SPECTROMETER

CROSS REFERENCE TO RELATED APPLICATIONS

This application is a national stage application, filed under 35 U.S.C. §371, of International Application No. PCT/DE2015/200066, filed Feb. 6, 2015, which claims priority to German Application No. 10 2015 200 034.6, filed Jan. 5, 2015, and German Application No. 10 2014 206 061.3, filed Mar. 31, 2014, the contents of all of which as are hereby incorporated by reference in their entirety.

BACKGROUND

Technical Field

The invention relates to a spectrometer comprising a combination of at least one grating and at least one prism.

For analyzing broadband light, standard white light spectrometers combine at least one collimation optical unit, one dispersion optical unit, and one focusing optical unit with a detector, which is usually configured as a line scan or matrix image sensor nowadays, see FIG. 1. All optical units in turn consist of at least one element in each case. Lenses are generally used as collimator and focusing elements, although other embodiments are also known. Prisms and gratings are used individually as well as in combination for generating the necessary dispersion.

The dispersion optical unit is used to generate the angular dispersion D, i.e., for changing the direction of propagation of the light relative to the wavelength. In combination with the focusing optical unit, the light thus split (spectrum) is displayed at various sites on the detector. The latter enables the conversion of the intensity distribution over the displayed spectrum into an analog signal by exploiting the linear relationship between light intensity and photocurrent. In many present-day applications, the analog signal is digitized, stored, and analyzed in a computer system, e.g., PC, FPGA, etc.

The imaging characteristics of the spectrometer are highly dependent on the type and arrangement of the optical elements. If one first considers only the simplest optical structures and only the central dispersive element therein, it can be seen that there are two kinds: Prism and grating spectrometers. In the first case the design is always transmissive, whereas in the second case reflective arrays are also possible, see FIG. 2.

The angular dispersion of a prism spectrometer arises from the wavelength dependence of the refraction index n of the prism material. Applying Snell's law and with a prism angle of incidence $\alpha$, an associated angle of refraction $\gamma$, a prism angle of reflection $\beta$, a wavelength $\lambda$, and a prism angle $\epsilon$, the beam deflection of the prism is given as follows:

Deflection equation for a prism $$\sin(\beta) = n(\lambda)\sin\left(\varepsilon - \arcsin\left(\frac{\sin(\alpha)}{n(\lambda)}\right)\right) \quad \text{Formula 4}$$

Dispersion equation for a prism $$D = \frac{d\beta}{d\lambda} = \frac{\sin(\varepsilon)}{\cos(\gamma)\cos(\beta)} \frac{dn}{d\lambda} \quad \text{Formula 5}$$

According to the grating equation and with an angle of deflection $\beta$, a diffraction order $\mu$, and a grating constant g, the angular dispersion of a grating spectrometer is:

Dispersion equation for a grating $$D = \frac{d\beta}{d\lambda} = \frac{\mu}{g\cos(\beta)} \quad \text{Formula 6}$$

If one analyzes Formula 2 and Formula 3 in terms of the dispersion characteristics, the non-linear relationship between wavelength and deflection becomes evident very quickly. When a grating is used and according to the chosen definition, a linear relationship between dispersion (and hence imaging position) and wavelength only exists in a very narrow range around $\beta=0$. Due to the multiple non-linear parameters that enter in, the setup for the linear relationship between dispersion and wavelength is even more difficult when a prism is used. By suitably combining optical components, it is nevertheless possible to generate an approximately linear representation in terms of wavelength for the whole system, see for example U.S. Pat. No. 6,661,513, Granger, 2003.

However, a linear dispersion behavior with regard to wavelength is not advantageous for every application. There are various measurement techniques, e.g., confocal-chromatic distance measurement and white light interferometry, in which the measured variable or rather the underlying signals is/are by nature non-linearly encoded in the wavelength. If the imaging in the spectrometer is not adjusted with this relationship taken into account, then signals need to be converted before the actual analysis, which can be a rather complicated process. There are two considerable disadvantages associated with this intermediate step. Additional resources are required for it on the one hand, and additional errors are nearly always induced on the other hand. Even with successful and error-free rescaling, limitations in terms of the measured values may still arise. White light interferometry techniques are a notable example of this. According to the Nyquist criterion (and thus the greatest change of the circular wave number k of neighboring detector elements), with these techniques the maximum measurable frequency is already limited by the imaging. A subsequent rescaling cannot change this in any way.

Various inventions endeavor to solve this problem in a manner analogous to wavelength linearization through the use of additional optical components or through the combination of gratings and prisms. An early proposal has been described by W. A. Traub, "Constant-dispersion grism spectrometer for channeled spectra", JOSA A, Vol. 7, Issue 9, pp. 1779-1791 (1990). The fundamental idea is the combination of a grating and a prism (grism) and exploitation of the different dispersion behavior to compensate non-linearities. However, the proposal is based on the material dispersion of the prism, which is subordinate to the effect of the angle transfer function of the grating, at least in weakly dispersive prisms. A more recent application of circular wave number linearization is described in U.S. Pat. No. 6,816,258, Hutchin, 2004. This invention uses a transmission grism for linearization, wherein the grating can be integrated in different sides (faces) of the prism. U.S. Pat. No. 7,929,134, Hu et al., 2011 is an example of a construction that is similar, but based on spatial separation of the grating and the prism. US 2012024298, Saxer et al., 2012 describes an extended approach, the aim of which is likewise a linearization of the circular wave number. Additionally, the structure is designed to be sufficiently flexible such that a change in the spectrometer properties is possible during the application.

A minimum requirement for the degree of maximum residual linearity deviation of a k-linear spectrometer (100%/m with m detector elements) to be achieved was formulated by Gelikonov et al., "Linear-Wavenumber Spectrometer for High-Speed Spectral-Domain Optical Coherence Tomography", Optics and Spectroscopy, 2009, Vol. 106, No. 3, pp. 459-465. The authors show that the difficulty of the task increases due to the fact that detectors with a larger number of detector elements (pixels) are used, among other things. Initially, 256 elements were used in the applications described above. This number later increased to 512, and nowadays 1024 or 2048 elements are no rarity. In conjunction with the position and width of the wavelength range used, the requirement in terms of residual nonlinearity can quickly become critical again.

However, the analysis of the imaging characteristics can only be a part of the overall evaluation of a spectrometer. Additional evaluation factors that are not to be underestimated come into play in many applications. Whereas the question regarding the price of the system becomes a factor very quickly, at least in industrial applications, other factors only become evident upon further examination. Such a factor is the efficiency of the spectrometer, i.e., what portion of the incident light will still be recorded by the detector. This plays a substantial role in determining the necessary output of the light source or, if the latter is not influenceable, the sensitivity of the detector. Both components have an effect on the design and price of the system. Another factor that is not to be underestimated is characterized by the space requirement of the system. This question must not be underestimated, especially when several or many spectrometers are used. In the standard arrangement, the optical accessory elements needed for k-linearization increase the space requirements considerably. A current application (U.S. Pat. No. 8,102,537, Akishiba, 2012) even dispenses completely with optical k-linearization for the sake of saving space, and performs the correction by rescaling the spectrum. This system, which is clearly designed for industrial use, underscores the importance of the space requirement property of spectrometers property quite dramatically.

The standard approach for optimizing grating-prism combinations is characterized in that more or less simplified component equations are set up in the first step. The degree of simplifications was and is chosen in accordance with the availability of information and with the available computer capacity taken into account. In accordance with the intended component arrangement, a system equation is calculated from the component equations and fed together with the free parameters into the simulation or optimization. The optimum values corresponding to the free parameters can then be derived from the result of this process. These values as a whole define the global minimum in terms of the target value, e.g., of the residual deviation from the k-linear progression of the dispersion. In most cases the determined values cannot be achieved at all or only with difficulty. Therefore, components that are actually available and with properties that come as close as possible to the determined optimal parameters still need to be found, see Gelikonov et al.; Hu et al., "Fourier domain optical coherence tomography with a linear-in-wave number spectrometer", Optics Letters, 2007, Vol. 32, No. 24, pp. 3525-3527.

Upon closer examination of the known applications of the standard approach, it becomes evident that transmissive setups have always been pursued (as far as the authors know). While the use of reflection gratings is never ruled out, k-linear spectrometers with reflection gratings are not known. The considerable advantage of a transmission grating lies in the fact that incident and reflected rays are automatically separated. As a result, the other optical components can be easily positioned upstream and/or downstream thereof in the beam direction. However, disadvantages in terms of economic aspects must be accepted. On the one hand transmission gratings (at least in the near infrared range) are comparatively expensive and on the other hand they are available in only a few variations in terms of the technical parameters. In contrast, reflection gratings are considerably more economical and there is also a broad assortment available. However, they are only really efficient if they are operated in or near the Littrow mode. In a reflection grating, the Littrow mode is characterized in that incident and reflected rays are superimposed. Separation of the rays initially only seems possible by deviating considerably from the Littrow mode or by using an additional beam splitter. However, both approaches are clearly disadvantageous with regard to the efficiency of the spectrometer and are of hardly any importance in actual practice, see U.S. Pat. No. 6,661,513, Granger, 2003; U.S. Pat. No. 6,816,258, Hutchin, 2004; U.S. Pat. No. 7,929,134, Hu et al., 2011.

BRIEF SUMMARY

The problem addressed by the invention described in the following can be roughly summarized as a combination of the requirements and additional limitations already described above. A way had to be found that makes it possible to design a spectrometer that is as compact as possible and that fulfills the following conditions. First of all, the k-linearization should already take place optically and fulfill the criterion formulated by Gelikonov et al. To this end, 2048 detector pixels had to be provided. Secondly, the number of optical elements needed had to be minimized. Furthermore, space requirement and adjustment effort should be minimized and lastly, the cost of the components should also be reduced. Additionally, the entire structure should be designed to be as resistant as possible to heat effects.

If one considers the demands posed in their entirety and in conjunction with the known solution approaches, it very quickly becomes evident that some demands (in particular high compactness and sufficient k-linearization) are apparently mutually exclusive, or at least adversely influence each other. The high number of sensitive elements of the detector worsens these problems. To solve the problem posed, it was necessary to deviate considerably from the known approaches as far as some points were concerned.

The aforementioned problem is solved by a spectrometer having the features of claim 1. Accordingly, the spectrometer is configured and further developed in such a way that total reflection is used in at least one prism in order to achieve a compact spectrometer.

Advantageous embodiments of the spectrometer are described in the subordinate claims.

In these embodiments, a reflection grating can be used as a grating.

On the side of the prism that is characterized by total reflection, a splitting of the incident and reflected rays of the grating can become possible.

In a further advantageous manner, the angle between the reflection grating and the prism can be used for further optimizing the spectrometer characteristics.

In a further advantageous manner, the spectrometer characteristics can be linear in the circular wave number.

In another advantageous configuration, the spectrometer can compensate the dispersion-induced non-linear relationship between wavelength and focal point of a confocal chromatic measurement system such that the overall characteristics become linear in the object distance.

In a further advantageous manner, the spectrometer characteristics can be linear in the wavelength.

In a concrete embodiment, the prism and the grating can be positioned relative to each other in such a way that a ray of light passes through the prism twice.

For a particularly reliable and precise measurement, the grate can be positioned or oriented in such a way that it can be operated in the Littrow mode.

In a further advantageous manner, a lens array used for focusing light beams onto a detector can be included for an adjustment of the k-linearities.

In a further advantageous manner, a folding of beam paths can be effected in the spectrometer, preferably by means of a folding mirror.

The development of the spectrometer according to the invention had its starting point in the standard approach, i.e., in the search for a favorable grating-prism combination capable of fulfilling the stringent requirements for the set k-linearity. Almost invariably the solutions are only found close to the global optimum of practical arrangements, which among other things are characterized by a substantial angle between the grating and the prism face. As described in the preceding, a structure with a transmission grating is typically chosen. As a function of the required beam guidance for the spectral splitting, this gives rise to considerable optical distances between the components involved. Accordingly, a reduction of the geometric distances is only possible with the use of additional optical components (e.g., folding mirrors) and consequentially detrimental to the solution of the problem. The invention overcomes the aforementioned challenges by introducing two essential changes. First of all, the transmission grating is replaced with a reflection grating and the prism is positioned such that it can be transilluminated twice. To this end, the precisely defined application point of the total reflection on an inner side of the prism is used to effect a separation between the beam paths incident on and reflected from the grating. The reflection grating can consequently be oriented such that it is operated in the Littrow mode and such that efficiency is not compromised to any significant extent. The prism, which is transilluminated a second time after the grating in the form according to the invention, can consequently be positioned very close to and even in contact with the grating. Secondly, the lens system that is needed for refocusing anyway is included in the optimization of k-linearity. This step becomes necessary because, although the use of the reflection grating-prism array makes a very efficient and compact beam guidance possible, according to the standard criteria (Gelikonov et al.), it alone does not satisfy the k-linearity requirements. The portion of the necessary linearization not applied by the main array is thus absorbed by selectively using distortion effects of the refocusing lenses.

BRIEF DESCRIPTION OF THE FIGURES

There are now various options for developing and implementing the teaching of the present invention in an advantageous manner. For this purpose, reference is hereby made on the one hand to the subordinate claims, and on the other hand to the following explanation of exemplary embodiments of the teaching of the invention with reference to the drawings. Generally preferred embodiments and upgrades of the teaching are also explained in connection with the explanation of the preferred exemplary embodiments by means of the drawing. The drawings show:

DETAILED DESCRIPTION OF VARIOUS EMBODIMENTS

Figure 1:
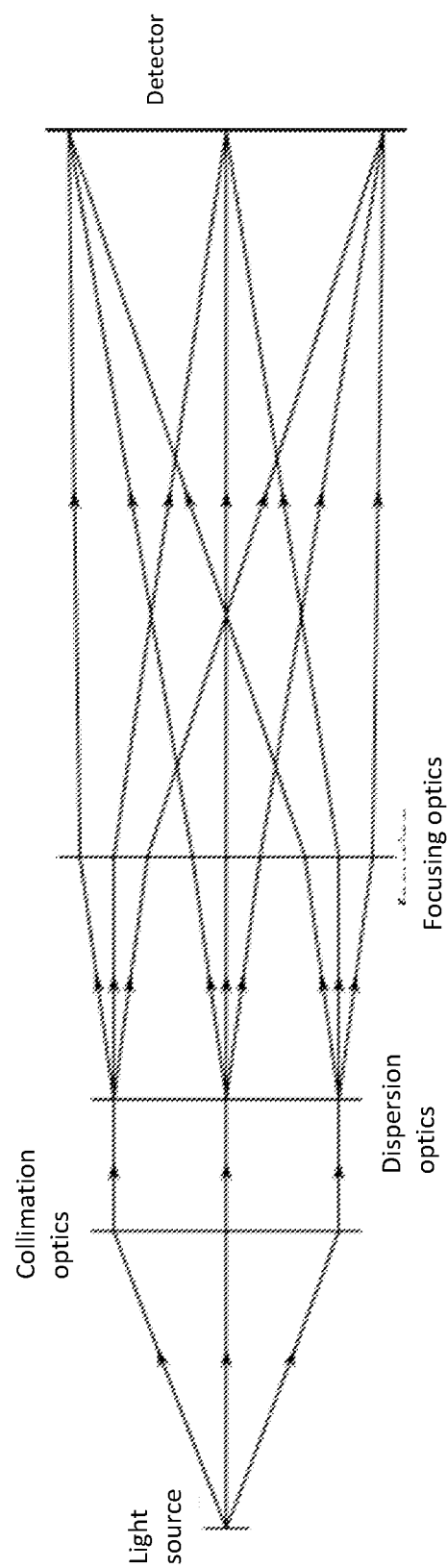
FIG. 1 A standard spectrometer, illustrated schematically.

FIG. 1 shows a standard spectrometer layout, illustrated schematically, with a collimation optical unit, a dispersion optical unit, and a focusing optical unit with a detector and a light source.

Figure 2:
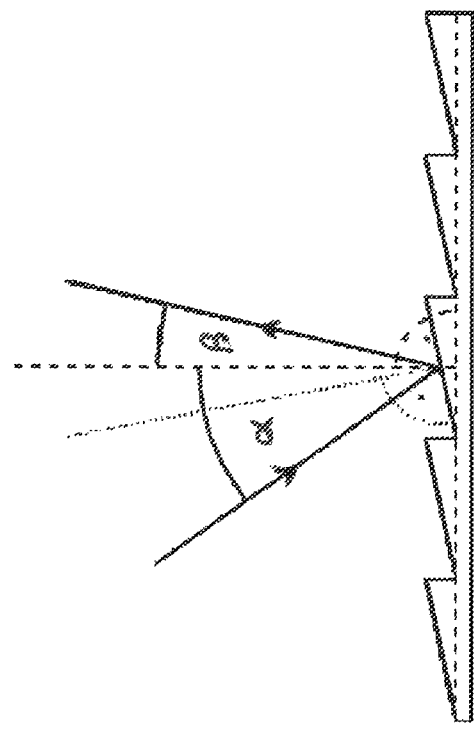
FIG. 2 Typical beam paths with a prism and a grating, illustrated schematically, and FIG. 3 An exemplary embodiment of a spectrometer according to the invention, illustrated schematically.
Figure 2:
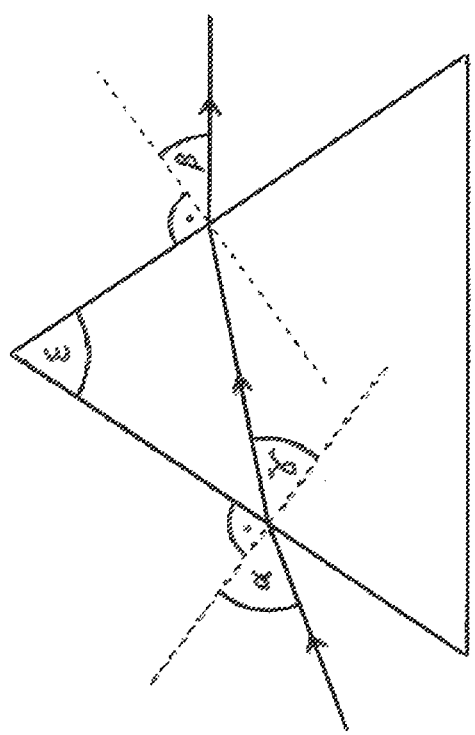

FIG. 2 shows beam paths in a prism and for a grating with the corresponding angular relationships of incident and reflected rays, illustrated schematically.

Figure 3:
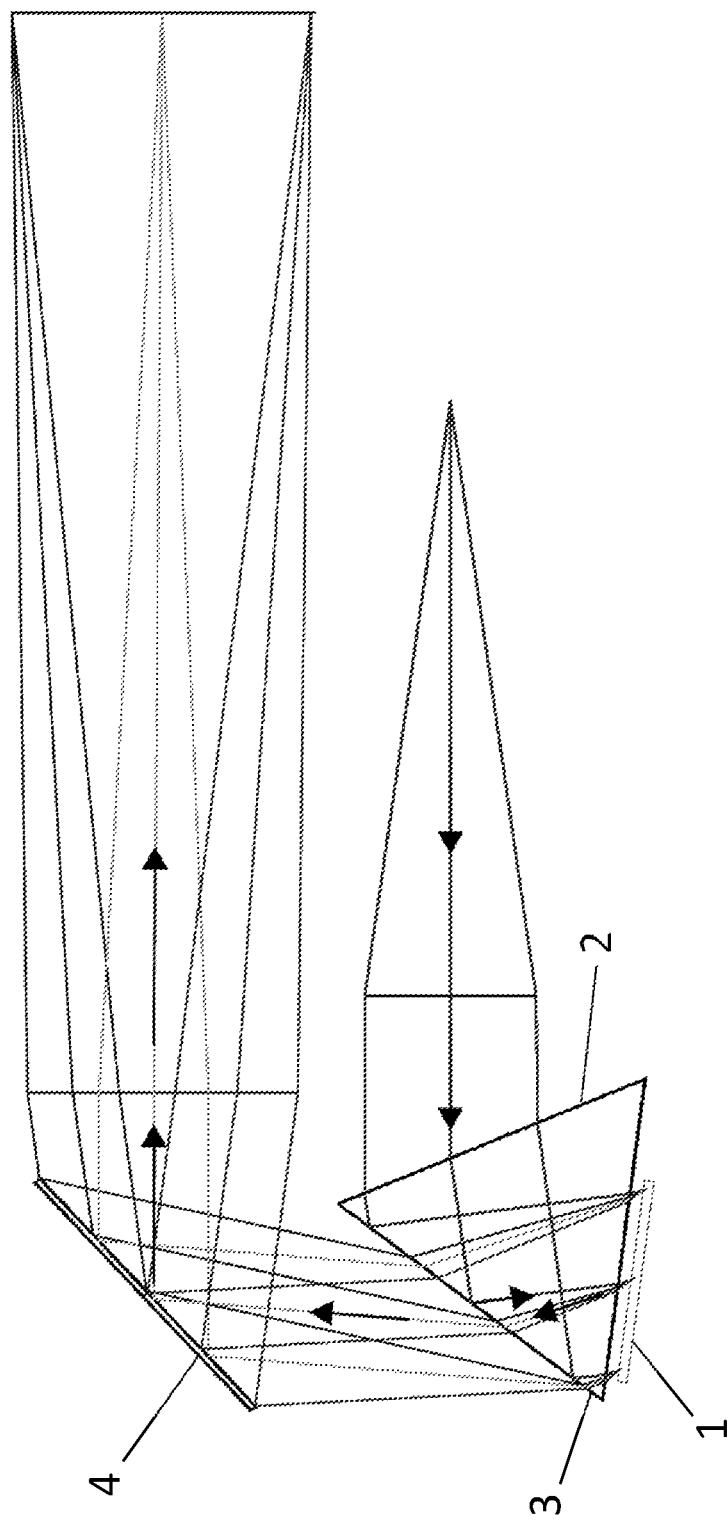

FIG. 3 shows an exemplary embodiment of a spectrometer according to the invention, illustrated schematically. In summary, the collimated, incident beam bundle contacts the first prism face at a defined angle such that, after covering a first distance in the prism 2, it is still reliably reflected with total reflection on the second prism face 3. After covering a second distance in the prism 2, the beams exit at the third lateral face and land on the reflection grating 1. Here the light rays of the beam bundle are refracted according to the respective wavelengths and once again land, at an angle different from the previous angle of reflection, on the third lateral face of the prism 2. After covering a third distance in the prism 2, the rays re-exit at the second prism face 3. They then pass through the last lens system, which focuses the beam bundles on the detector, in function of their wavelengths. As a whole, the grating-prism array initially provides a k-linearization that is still unsatisfactory, and a suitable correction is only possible in combination with the focusing optical unit.

In terms of greater compactness, another advantage of the construction according to the invention arises through the geometric distances between the individual components, which are considerably shorter compared to standard prism and grating combinations, see for example U.S. Pat. No. 6,661,513, U.S. Pat. No. 6,816,258, U.S. Pat. No. 7,929,134, etc. Among other things, these shorter distances result from the fact that necessary optical paths are superimposed in the grating-prism combination. The shorter required distances also exert a positive effect on the required dimensions of successive elements. Overall this means that smaller optical components (e.g., lenses) will be needed, even when catalog components are used. The latter can usually be purchased more economically, thus reducing the total cost of the spectrometer.

In addition to the properties of the invention described in the preceding, the compactness or shape of the spectrometer can be increased or adapted further by suitable folding of the beam paths. By way of an example, FIG. 3 contains a folding mirror 4 for demonstration.

In practical terms, for the elaboration and implementation of the invention it was possible to assume a known system, which shall serve as a basis for comparison in the following. The associated spectrometer was designed for 2048 pixel imaging and has a height of ca. 9 cm and a base area of ca. 340 $cm^2$, including the housing. The imaging is done linearly in the circular wave number. The underlying optical system is based on the spatially separated combination of transmission gratings and prisms and has already been optimized in terms of dimensions. For an equivalent 2048 pixel imaging with a reduced base area of ca. 130 cm², the newly developed system according to the invention described above only needs a height of about 4 cm. This corresponds to a reduction to <20% of the original volume, wherein the comparison must be interpreted carefully owing to the different shape of the base areas.

Although the preferred implementation of the invention presents a compact spectrometer with linear characteristics in terms of the circular wave number, the invention is not limited to this application case. Another expression of the invention can turn out such that the linearity arises in the wavelength rather than in the circular wave number. In principle this is achievable directly by using a suitable grating, but is then subject to the aforementioned limitations in terms of linear deviation and the necessary angles of incidence and reflection. For reducing linear deviation, according to the prior art use is typically made of optical accessory elements, for example prisms, which are easily transilluminated. Using the construction according to the invention, i.e., use of the total reflection in the prism and multiple transillumination, considerably more compact spectrometers can be constructed here as well. As already described above, advantages in terms of both component assortment and price often arise as well.

Although linearity in terms of circular wave number or wavelength is usually sought with the combination of gratings and prisms, this is not practical for all applications. A known example is that of confocal chromatic measurement systems, the distance characteristic curve of which is not linear in either wavelength or circular wave number. Spectrometers that have approximately linear wavelength characteristics are typically used in such systems. To this end, mostly simple setups composed of reflection or transmission gratings in combination with imaging optics are used. But with better spectrometer characteristics, the effort for further processing can be reduced considerably here as well. At the same time, the quality of the results is often increased too, for example in the form of reduced linear deviation of the measurement values.

However, the spectrometers of confocal chromatic systems would have to be designed differently for generating a linear characteristic with respect to the object distance. Although a linear characteristic in terms of the circular wave number would be considerably superior to the approach described above (linear in the wavelength), it still does not represent the ideal configuration. Rather, the non-linearity of the dispersion behavior in the measuring head in function of the wavelength range used would need to be taken into account and compensated for by suitably configuring the dispersion behavior in the spectrometer. As far as the authors know, there is no system on the market that follows this approach. The reason for this presumably lies in the costs for the necessary accessory components as well as in the resultant larger spectrometers. Another possibility is that the costs-benefits ratio is simply not acceptable at the present time. This ratio can be further improved by using the construction according to the invention.

Depending on the complexity of the configuration of the dispersion correction in the spectrometer, it can be helpful to break up the direct contact or rather the integration of the grating and the prism. By doing so an angle can be interposed between the grating and the prism without sacrificing the fundamental property of total reflection in the prism. The additional angle expands the degrees of freedom for optimizing linear deviation at the expense of a greater adjustment effort.

In addition to the embodiments of the invention described in the preceding, the approach can be used wherever grating-prism combinations with simple light transmission have been used to date. The price and size of spectrometers frequently play a major role in industrial applications. Although existing systems will not be adapted, the invention offers considerable advantages in this regard for the new development of industrial spectrometers.

As regards to further advantageous embodiments of the spectrometer, it is noted that the problem addressed by the inventive concept can be roughly summarized as a combination of the requirements and additional limitations already described above. A way had to be found that makes it possible to design a spectrometer that is as compact as possible and that fulfills the following conditions. First of all, the k-linearization should already take place optically and fulfill the criterion formulated by Gelikonov et al. To this end, 2048 detector pixels had to be provided. Secondly, the number of optical elements needed had to be minimized. Furthermore, space requirement and adjustment effort should be minimized and lastly, the cost of the components should also be reduced. Additionally, the entire structure should be designed to be as resistant as possible to heat effects.

If one considers the demands posed in their entirety and in conjunction with the known solution approaches, it very quickly becomes evident that some demands (in particular high compactness and sufficient k-linearization) are apparently mutually exclusive, or at least adversely influence each other. The high number of sensitive elements of the detector worsens these problems. To solve the problem posed, it was necessary to deviate considerably from the known approaches as far as some points were concerned.

The aforementioned problem is solved by a spectrometer having the features of claim 1. Accordingly, the spectrometer is configured and further developed in such a way that total reflection is used in at least one prism in order to achieve a compact spectrometer.

Advantageous embodiments of the spectrometer are described in the subordinate claims.

In these embodiments, a reflection grating can be used as a grating.

On the side of the prism that is characterized by total reflection, a splitting of the incident and reflected rays of the grating can become possible.

In a further advantageous manner, the angle between the reflection grating and the prism can be used for further optimizing the spectrometer characteristics.

In a further advantageous manner, the spectrometer characteristics can be linear in the circular wave number.

In another advantageous configuration, the spectrometer can compensate the dispersion-induced non-linear relationship between wavelength and focal point of a confocal chromatic measurement system such that the overall characteristics become linear in the object distance.

In a further advantageous manner, the spectrometer characteristics can be linear in the wavelength.

In a concrete embodiment, the prism and the grating can be positioned relative to each other in such a way that a ray of light passes through the prism twice.

For a particularly reliable and precise measurement, the grate can be positioned or oriented in such a way that it can be operated in the Littrow mode.

In a further advantageous manner, a lens array used for focusing light beams onto a detector can be included for an adjustment of the k-linearities.

In a further advantageous manner, a folding of beam paths can be effected in the spectrometer, preferably by means of a folding mirror.

The development of the spectrometer according to the invention had its starting point in the standard approach, i.e., in the search for a favorable grating-prism combination capable of fulfilling the stringent requirements for the set k-linearity. Almost invariably the solutions are only found close to the global optimum of practical arrangements, which among other things are characterized by a substantial angle between the grating and the prism face. As described in the preceding, a structure with a transmission grating is typically chosen. As a function of the required beam guidance for the spectral splitting, this gives rise to considerable optical distances between the components involved. Accordingly, a reduction of the geometric distances is only possible with the use of additional optical components (e.g., folding mirrors) and consequentially detrimental to the solution of the problem. The invention overcomes the aforementioned challenges by introducing two essential changes. First of all, the transmission grating is replaced with a reflection grating and the prism is positioned such that it can be transilluminated twice. To this end, the precisely defined application point of the total reflection on an inner side of the prism is used to effect a separation between the beam paths incident on and reflected from the grating. The reflection grating can consequently be oriented such that it is operated in the Littrow mode and such that efficiency is not compromised to any significant extent. The prism, which is transilluminated a second time after the grating in the form according to the invention, can consequently be positioned very close to and even in contact with the grating. Secondly, the lens system that is needed for refocusing anyway is included in the optimization of k-linearity. This step becomes necessary because, although the use of the reflection grating-prism array makes a very efficient and compact beam guidance possible, according to the standard criteria (Gelikonov et al.), it alone does not satisfy the k-linearity requirements. The portion of the necessary linearization not applied by the main array is thus absorbed by selectively using distortion effects of the refocusing lenses.

Finally, explicit reference is made to the fact that the exemplary embodiments of the spectrometer according to the invention described above are used only for explanation of the claimed teaching, but the teaching is not restricted to the exemplary embodiments.

REFERENCE LIST

1 Grating, reflection grating
2 Prism
3 Side, second prism face
4 Folding mirror

The invention claimed is:

1. A compact spectrometer comprising:
a reflection grating (1); and
at least one prism (2) in combination with the at least one grating (1),
wherein:
 beginning of total reflection is provided in the at least one prism (2) in order to achieve the compact spectrometer and a splitting of incident and reflected rays of the reflection grating (1), and
 the at least one prism (2) is positioned in such a manner that a light beam passes through the at least one prism (2) twice, and
wherein at least one of:
 characteristics of the spectrometer are linear in the circular wave number,
 the spectrometer compensates a dispersion-induced non-linear relationship between wavelength and focal point of a confocal chromatic measurement system such that overall characteristics of the spectrometer become linear in the object distance, or
 the spectrometer characteristics are linear in the wavelength.

2. The spectrometer according to claim 1, wherein the splitting of the incident and reflected rays of the grating (1) occurs on a side (3) of the prism (2) characterized by the total reflection.

3. The spectrometer according to claim 1, wherein the reflection grating (1) and the prism (2) are positioned at a specific angle relative to one another, the angle between the reflection grating and the prism (2) being configured to further optimize the spectrometer characteristics.

4. The spectrometer according to claim 1, wherein the light beam passes through the prism (2) twice due to a relative positioning of the prism (2) and the grating (1) relative to one another.

5. The spectrometer according to claim 1, wherein the grating (1) is positioned or oriented such that the grating (1) operates in the Littrow mode.

6. The spectrometer according to claim 1, further comprising a lens array configured for focusing the light beam onto a detector so as to adjust for k-linearities.

7. The spectrometer according to claim 1, wherein a folding of beam paths occurs in the spectrometer.

8. The spectrometer as in claim 7, wherein the folding of beam paths occurs via a folding mirror (4).

* * * * *